Figure 10:
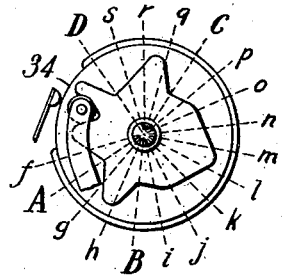

J. LE C. DAVIS.
SYSTEM AND METHOD OF CONTROLLING ELECTRIC MOTORS.
APPLICATION FILED NOV. 8, 1911.
1,199,453.
Patented Sept. 26, 1916.
3 SHEETS—SHEET 1.
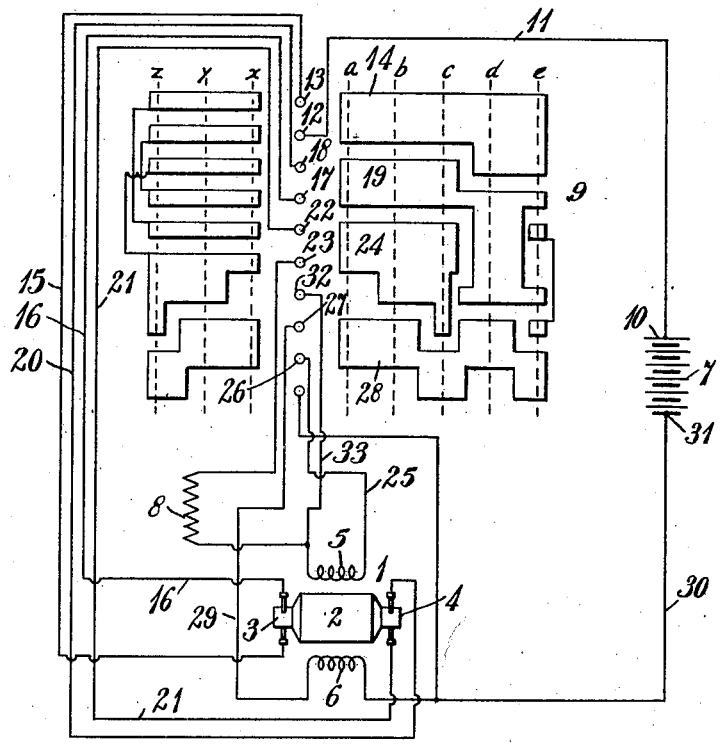
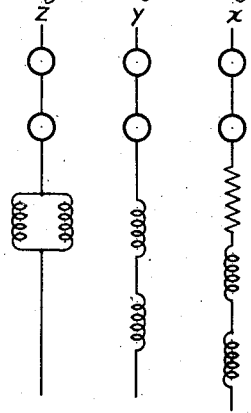
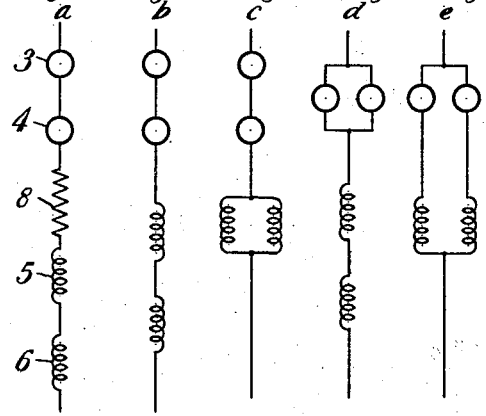
WITNESSES:
INVENTOR
Joseph Le C. Davis
BY
ATTORNEY.

J. LE C. DAVIS.
SYSTEM AND METHOD OF CONTROLLING ELECTRIC MOTORS.
APPLICATION FILED NOV. 8, 1911.

1,199,453.

Patented Sept. 26, 1916.
3 SHEETS—SHEET 2.

WITNESSES:

INVENTOR

BY

ATTORNEY.

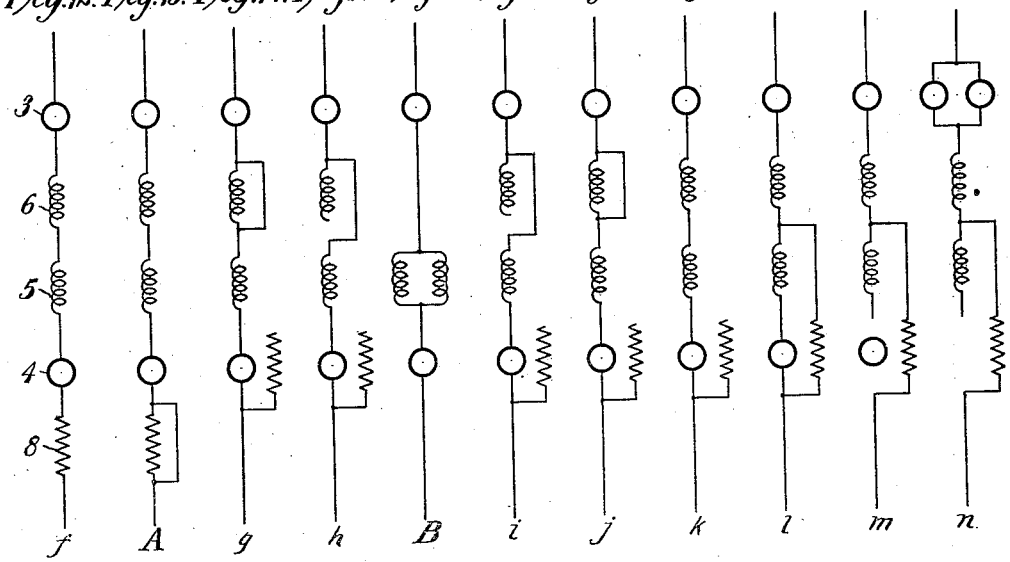
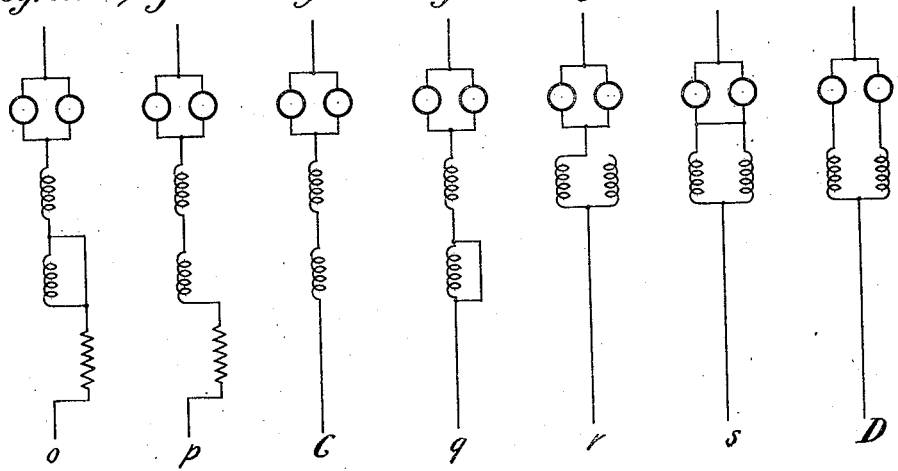

UNITED STATES PATENT OFFICE.

JOSEPH LE CONTE DAVIS, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM AND METHOD OF CONTROLLING ELECTRIC MOTORS.

1,199,453. Specification of Letters Patent. Patented Sept. 26, 1916.

Application filed November 8, 1911. Serial No. 659,156.

*To all whom it may concern:*

Be it known that I, JOSEPH LE C. DAVIS, a citizen of the United States, and a resident of Pittsburgh, in the county of Allegheny and State of Pennsylvania, have invented a new and useful Improvement in Systems and Methods of Controlling Electric Motors, of which the following is a specification.

My invention relates to systems and methods for controlling electric motors and it has special reference to the control of electric vehicle or automobile motors which are supplied with energy from storage batteries.

The object of my invention is to provide a simple method of controlling electric motors of the class above indicated and a system embodying the same, by means of which a plurality of motor-operating speeds may be secured without changing the circuit connections of the battery, without the material loss of energy in external resistance or resistances, and without either interrupting the motor circuit or materially reducing the torque of the motor in passing from any control position to the next.

Various methods of controlling vehicle motors have heretofore been devised, among which I desire to call attention to the following: Patent No. 765,209, granted July 19, 1904, to the Westinghouse Electric & Manufacturing Company on an application of N. W. Storer, sets forth a method of control which consists in varying the voltage applied to the motor by changing the connections of the battery from series to multiple groups, and the field magnet windings of the motor from series to multiple sections. Patent No. 960,896, granted June 7, 1910, to the Baker Motor Vehicle Company on an application of E. Gruenfeldt, sets forth a system of control in which a permanent circuit arrangement between the cells of the battery is maintained and the motor speed is varied by changing the field magnet windings from a series to a multiple arrangement of sections and by the use of a variable resistance in the armature circuit.

In a control system embodying a storage battery, it is considered desirable, in most cases, to maintain a permanent connection and arrangement between the cells of the storage battery, but it is also particularly desirable, for automobile service, to secure a plurality of motor speeds without dissipating energy by the use of armature resistance in any of the operating positions.

The aforesaid objective results are secured by the use of my invention, according to which the vehicle motor is provided with an armature winding having two relatively independent parts which are connected either in series or in multiple circuit relation and a divided field magnet winding, the parts which may also be connected in series or in multiple circuit relation and combined with the various armature arrangements to produce a plurality of efficient operating speeds from a constant potential source of energy.

One of the salient features of my invention is the method of changing from a series to a multiple relation between the parts of the armature winding without losing or varying the motor torque, and it depends upon the temporary shunting of one part of the motor armature winding and one part of the field magnet winding by a resistor which is so designed as to permit the active half of the motor to momentarily assume all of the motor load.

Figure 11:
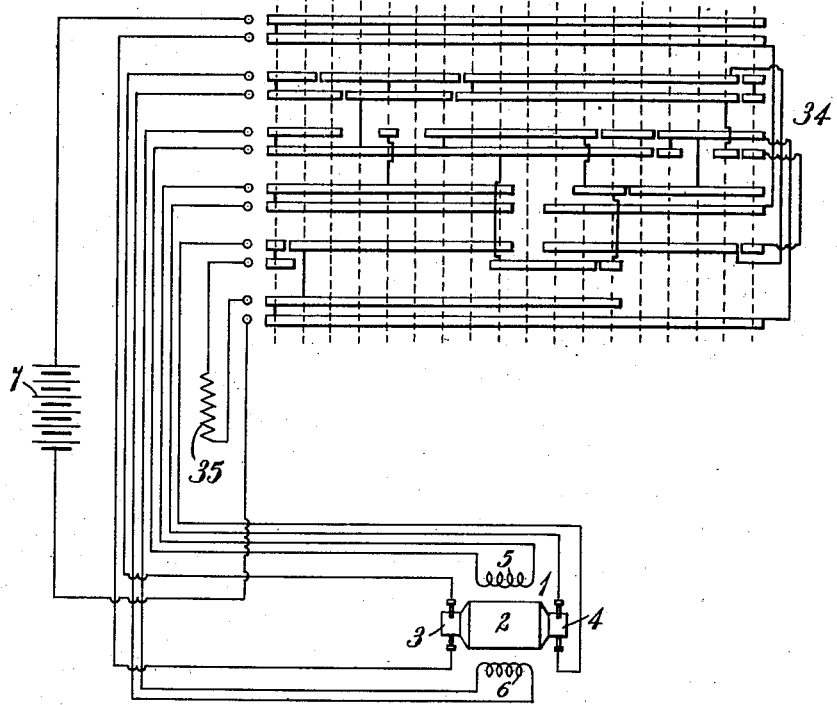

Figure 1 of the accompanying drawings is a diagrammatic view of a system of control arranged and adapted to operate in accordance with my invention. Figs. 2 to 9, inclusive, are simple diagrams illustrating the relations between the parts of the motor armature winding and the sections of the motor field windings. Fig. 10 is a diagrammatic plan view of a control drum and Fig. 11 is a diagrammatic view embodying a single-plane development of the device shown in Fig. 10 and illustrating a modified arrangement for carrying out my invention without interrupting the motor circuit during a complete adjustment of the controller. Figs. 12 to 29, inclusive, are simple diagrams illustrating not only the arrangement and circuit connections existing between the sections of armature winding and the field magnet winding of the motor, but also the arrangement and connections of these members in the intermediate or transition positions of the controller.

Referring to Figs. 1 to 9, inclusive, the system here shown comprises a motor 1 having an armature 2, commutators 3 and 4, field magnet winding sections 5 and 6, a storage battery 7, which may be replaced by any other source of energy, a resistor 8 and a controller 9 which is adapted to occupy a plurality of forward positions *a* to *e*, inclusive, and reverse positions *x*, *y* and *z*.

The operation of the system is as follows: Assuming that the controller 9 is in position *a*, circuit is established from a terminal 10 of the storage battery 7 through conductor 11, contact fingers 12 and 13, which are bridged by contact segment 14, conductor 15, commutator cylinder 3 (circuit being completed through one section of the armature winding), conductor 16, contact fingers 17 and 18, which are bridged by contact segment 19, conductor 20, commutator cylinder 4 (circuit being completed through the second section of the armature winding), conductor 21, contact fingers 22 and 23, which are bridged by contact segment 24, resistor 8, section 5 of the field magnet winding, conductor 25, contact fingers 26 and 27, which are bridged by contact segment 28, conductor 29, field magnet winding section 6 and conductor 30 to the opposite terminal 31 of the battery 7. The circuit connections are thus completed through the two sections of the armature winding, the resistor 8 and the two sections of the field magnet winding in series relation, as shown in Fig. 5. When the controller 9 is moved from position *a* to position *b*, contact finger 32 moves into engagement with contact segment 24 and thus a shunt to the resistor 8 is completed from the contact finger 22 through contact segment 24, finger 32 and conductor 33 to section 5 of the field magnet winding. The circuit connections are now clearly shown in Fig. 6. As the controller successively occupies positions *c*, *d* and *e*, the circuit connections shown in Figs. 7, 8 and 9 are effected, the sections of the field magnet winding being first connected in multiple circuit relation with the armature sections in series, the armature sections being then connected in multiple circuit relation with the field sections in series and finally both the armature and the field magnet winding sections being connected in multiple circuit, the series relation between the armature sections and the field sections being maintained.

Referring to Figs. 10 to 29, inclusive, the system here shown is similar to the system shown in Fig. 1, except that a controller 34 is substituted for the controller 9. The controller 34 effects the same results that are secured by the use of the controller 9 in each of the main positions of the controller, but a series of intermediate transition positions are provided in order to secure such a succession of circuit changes as to obtain the desired results without interrupting the motor circuit or permitting any material reduction in the motor torque throughout the complete adjustment of the controller drum. This is particularly desirable for governing an electric driving motor of an automobile or other road vehicle since it insures a particularly smooth acceleration of the motor. Most of the advantages, however, which can be secured by the controller of Figs. 10 and 11 are also secured by the controller of Fig. 1 which will usually be found preferable by reason of its simplicity.

As controller 34 is moved from its "off" position to the position *a*, a resistor 35, corresponding to resistor 8 of Fig. 1, is temporarily inserted and then short circuited, the circuit connections for the transition position *f* being indicated in Fig. 12 and the connections for position A being indicated in Fig. 13. It will be observed that Fig. 13 corresponds to Fig. 6. Passing from position A to position B, the controller traverses two transition positions *g* and *h*, illustrated in Figs. 14 and 15, one section of the field magnet winding being first short circuited and then open circuited and finally connected in parallel with the other section when the operating position B is reached. Between the position B and the operating position C, eight transition positions *i* to *p*, inclusive, are located. The positions *i*, *j* and *k* correspond, respectively, to the positions, *h*, *g* and A. In the position *l*, the resistor is connected in shunt circuit relation to one section of the armature and one section of the field magnet winding, as shown in Fig. 20. In position *m*, the shunted armature sections is disconnected and in position *n*, as shown in Fig. 22, it is connected in multiple relation with the other armature section. In position *o*, Fig. 23, one section of the field winding is short circuited and the resistor is connected in circuit. In position *p*, Fig. 24, the field section shunt is removed and finally, when the controller reaches position C, the resistor is removed from the circuit. Between operating positions C and D, three transition positions *q*, *r* and *s* are located which differ from the preceding position as positions *g*, *h* and B differ from the position *a*. Finally, when the controller occupies position D, the motor is arranged in two parallel circuits, each including one section of the armature winding and one section of the field magnet winding.

Between the positions B and C, one of the armature parts and one of the field parts are short circuited by the resistor, as shown in Fig. 20, and under these conditions, the active half of the motor momentarily assumes all of the motor load. This fact depends upon the magnetic relation between the two fields and between the two armature winding parts.

It is evident that variations may be effected in the circuit connections and in the proportioning of the controllers and their various positions within the spirit and scope of my invention.

I claim as my invention:

1. The method of controlling an electric motor having divided armature and field magnet windings which consists in connecting parts of the armature and parts of the field magnet winding in series relation, shunting one armature and one field magnet winding part by a translating device and successively connecting the shunted parts in multiple circuit relation with the corresponding active parts.

2. The method of controlling an electric motor having divided armature and field-magnet windings which consists in connecting parts of the armature and parts of the field-magnet winding in series relation, shunting one armature and one field-magnet winding part by a translating device, successively connecting the shunted parts in multiple relation with the corresponding active parts and removing the translating device from circuit intermediate the connecting of the respective shunted parts in multiple relation.

3. The method of controlling an electric motor having divided armature and field magnet windings which consists in connecting parts of the armature and parts of the field magnet winding in series relation, shunting one armature and one field magnet winding part by a resistor and successively connecting the shunted parts in multiple relation with the corresponding active parts, whereby the entire motor load is momentarily borne by a part of the motor windings and the torque of the motor is maintained substantially constant.

4. The method of controlling an electric motor having divided armature and field magnet windings which consists in connecting parts of the armature and parts of the field magnet winding in series relation, doubling the current in certain parts of the windings by shunting a resistor across one armature and one field magnet winding part, successively connecting the shunted parts in multiple relation with the corresponding active parts and removing the resistor from circuit intermediate the connecting of the respective parts in multiple relation, whereby the motor torque is maintained substantially constant.

5. The method of control which consists in connecting electric motor armature windings and field magnet windings in series relation, shunting one armature winding and one field magnet winding by a resistor, connecting the shunted armature winding in multiple circuit with the active armature winding, and finally connecting the shunted field winding in multiple to the active field winding.

6. The method of controlling electric motors which consists in connecting the armature windings and field magnet windings in series circuit relation, shunting one armature and one field magnet winding by a resistor, interrupting the circuit of said shunted windings, connecting the shunted armature winding in multiple relation with the other armature winding, connecting the shunted field winding in series with the other field winding, and removing the resistor from circuit.

7. The method of controlling electric motors which consists in connecting the armature windings and field magnet windings in series circuit relation, shunting one armature and one field magnet winding by a resistor, interrupting the circuit of said shunted windings, connecting the shunted armature winding in multiple relation with the other armature winding, connecting the shunted field winding in series with the other field winding, short circuiting one of the field windings and connecting it in series circuit with one of the armatures.

8. The method of controlling an electric motor having divided armature and field magnet windings which consists in connecting parts of the armature and parts of the field magnet winding in series circuit relation, shunting one armature and one field magnet winding part by a translating device, interrupting the circuit of said shunted parts, and connecting parts of said armature winding in multiple relation and in series with one of the field magnet winding parts and the translating device.

In testimony whereof, I have hereunto subscribed my name this 31st day of Oct., 1911.

JOSEPH LE CONTE DAVIS.

Witnesses:
 JOHN S. DEAN,
 B. B. HINES.